United States Patent [19]

Bolton

[11] Patent Number: 4,458,875
[45] Date of Patent: Jul. 10, 1984

[54] EASY RELEASE MOLD

[76] Inventor: John D. Bolton, 5 Shiloh Cir., Irvine, Calif. 92714

[21] Appl. No.: 537,259

[22] Filed: Sep. 29, 1983

[51] Int. Cl.³ .............................................. B29C 1/04
[52] U.S. Cl. .................................. 249/114 R; 249/57; 249/79; 425/174.2; 425/174.4
[58] Field of Search ................. 249/114 R, 61, 62, 57, 249/79; 425/40, 41, 174, 174.2, 174.4

[56] References Cited

U.S. PATENT DOCUMENTS

| 2,003,432 | 6/1935 | Finch | 249/DIG. 1 |
| 2,290,396 | 7/1942 | Webster | 249/DIG. 1 |
| 2,581,939 | 1/1952 | Deist et al. | 425/41 X |
| 2,738,406 | 3/1956 | Zaleski | 425/41 X |
| 3,252,683 | 5/1966 | Uetzmann | 249/DIG. 1 |
| 4,123,306 | 10/1978 | Landry | 425/174.2 X |
| 4,157,464 | 6/1979 | Smith et al. | 425/174.4 X |
| 4,208,562 | 6/1980 | Perreault | 425/174.4 X |

Primary Examiner—J. Howard Flint, Jr.
Attorney, Agent, or Firm—John Darcy Bolton

[57] ABSTRACT

The apparatus consists of a vessel that is transparent to microwaves, an inner coating of material that is heated by microwaves and a coating inside that that will reflect microwaves.

In use the user allows his mold substance to set in the ordinary way. When he desires to release his moldable from the molded substance he applies microwaves to the outside of the vessel. The waves pass through the outer transparent wall and heat the inner coating. Conductivity of heat causes the surface of the molded object to be heated, to liquefy and release from the mold. The innermost layer of reflective substance prevents the microwaves from penetrating into the molded object and heating the whole molded object.

What is new is an apparatus that will permit the user to quickly and conveniently release a molded object from a mold without any risk that he will heat and destroy portions of the molded object.

1 Claim, 1 Drawing Figure

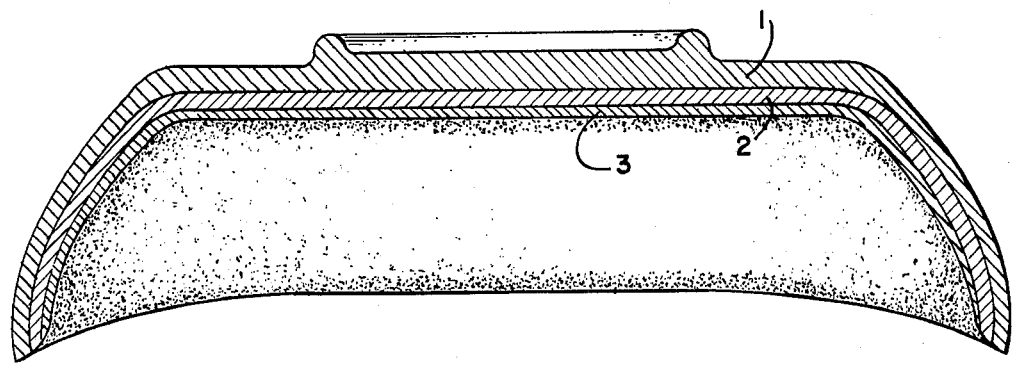

EASY RELEASE MOLD

FIELD OF THE INVENTION

This apparatus relates to mold release mechanisms.

DESCRIPTION OF THE PRIOR ART

At the present state of the art molding objects is widely practiced and very useful art. Molding is practiced in the metals and plastics industry and in preparation of foods among many others. However, releasing the molded object from the mold is always a problem.

For example, in a domestic situation, interesting jelly shapes are prepared by pouring hot liquefied colored and flavored gelatin into molds. The jelly is released from the mold by applying running hot water to the outside of the mold or applying cloths saturated with hot water to the outside of the mold. The heat is applied very unevenly and there is no practical way to get exactly even heating over the entire mold. Typically, part of the jelly is destroyed by too much heat, some of the remainder sticks to the mold upon release of the major portion. All the time this is going on it is very hard to keep the hot water out of the jelly.

Mold release agents such as oils are very widely used, but they cost money to buy, the user incurs a labor cost to apply them and may times the release agents are undesirable on the finished product. For example, where the object will later be painted or sold directly to the consumer, removing the release oil involves another operation. In the case of a home maker preparing a jelly desert, there is no convenient mold release agent available and no way to remove one from the jelly surface if one was applied.

The object of my invention is to offer a convenient way to release the mold without purchasing or applying any substance and without risking heating the whole object.

SUMMARY OF THE INVENTION

The apparatus consists of a vessel that is transparent to microwaves, an inner coating of material that is heated by microwaves and a coating inside that that will reflect microwaves.

In use the user allows his mold substance to set in the ordinary way. When he desires to release his mold from the molded substance he applies microwaves to the outside of the vessel. The waves pass through the outer transparent wall and heat the middle coating. Conductivity of heat causes the surface of the molded object to be heated, to liquefy and release from the mold. The innermost layer of reflective substance prevents the microwaves from penetrating into the molded object and heating the whole molded object.

The object of my invention is to offer an apparatus that will release a molded object from a mold quickly and conveniently without the application of any release agent and without any risk of harm to the molded object by heating the whole object.

BRIEF DESCRIPTION OF THE DRAWINGS

In the drawing FIG. 1 is a perspective diagrammatic partially cut away view of the vessel shown in inverted position.

DESCRIPTION OF THE PREFERRED EMBODIMENT

In describing one selected embodiment of my invention illustrated in the drawing, specific terminology is resorted to for the sake of clarity; however, it is not intended to be limited to the specific terms so selected and it is to be understood that each specific term includes all technical equivalents which operate in a similar manner to accomplish a similar purpose.

Turning now to the specific embodiment of my invention selected for illustration, in FIG. 1, 1 is the cut wall of the vessel, 2 is a layer of a substance that is heated by microwaves, 3 is an inner surface if a microwave reflecting substance.

OPERATION OF THE APPARATUS

In manufacture a substance that is transparent to microwaves is selected to make the vessel or bowl. Paper, many plastics, glass and most ceramic compounds are all in that group. The interior of the vessel is coated with a substance that is heated by microwaves. That substance is any substance with a polarized molecule such as water, many organic compounds and many plastics. The inner surface is coated with a microwave reflecting substance. Most metals will do this and the ferrite compounds are already widely used for this purpose at this time.

The user uses the vessel to mold in the ordinary way. When the substance has set, the user applies microwaves which causes heating of the middle layer. Conductivity of heat causes a very thin surface layer of the molded object to be heated, to liquefy and release the whole molded object.

A typical use would be a home maker that molds a jelly desert in the described bowl. When it has set it is placed in the microwave oven upside down on a plate. Microwave power is applied for a short time. A very thin layer of the jelly is heated and liquefies.

It is to be understood that the form of my invention selected for illustration here and described herein is to be taken as a preferred embodiment. For example equivalent elements may be substituted for those illustrated and described. There are a wide variety of substances that will absorb microwaves and cause heating and another well known list that will reflect microwaves. The use of any of these are within the spirit and scope of my invention. My inventions includes those coatings that are mixtures of substances that include reflecting and absorbing substances in their composition.

The advantages of my invention are that the user may quickly and conveniently release a molded object from a mold without any risk of over heating parts of the molded object and without having to buy, apply and remove a mold release agent.

Having thus described and disclosed my invention I claim:

1. A mold for releasing a molded object therefrom comprising, in combination, a vessel of a substance transparent to microwaves, said vessel having an inner coating of a substance that is excited by microwaves and is heated by them, and said vessel coated again on the inner surface with a substance that reflects microwaves.

* * * * *